United States Patent Office 3,423,211
Patented Jan. 21, 1969

3,423,211
WHIPPABLE TOPPING MIX
John J. Miles, Jr., Westwood, Morton Pader, West Englewood, and Stuart W. Thompson, Upper Saddle River, N.J., assignors to Lever Brothers Company, New York, N.Y., a corporation of Maine
No Drawing. Filed Oct. 22, 1965, Ser. No. 502,300
U.S. Cl. 99—139       19 Claims
Int. Cl. A23g 3/00; A23l 1/14

ABSTRACT OF THE DISCLOSURE

A whippable topping mix containing a base fat, a water dispersible protein and 3–10% of a monoacetylated monoglyceride of a $C_{16}$–$C_{18}$ fatty acid and other additives.

---

This invention relates to a dry whippable topping mix. More particularly, it is concerned with a whipped topping therefrom.

It is known to combine a base fat, a sweetening agent, non-fat milk solids and an emulsifier in an aqueous emulsion and to dry the emulsion to yield a whippable topping mix. This whippable topping mix is capable of being reconstituted with milk or water and whipped subsequently to provide a whipped topping, i.e., a product having properties similar to whipped cream. Accordingly, the terminology "whipped topping" defines a well-known limited class of products, and this terminology excludes non-analogous products, such as icing, topping with a stiff, heavy body, pudding, mayonnaise, and cake with shortening, which are not similar to whipped cream.

In the past, various emulsifiers have been used in a dry whippable topping mix. For example, a partial ester of a higher fatty acid, such as propylene glycol monostearate, has been employed (U.S. Pat. No. 2,913,342). However, the whipped topping therefrom has certain disadvantages, e.g., low percent overrun, heavy bodied foams and a marked tendency to curd in the mouth.

Another emulsifier used in a dry whippable topping mix prior to this invention is a lactylated ester of glycerol and a higher fatty acid, such as glyceryl lactopalmitate, glyceryl lactostearate and glyceryl lactooleate (U.S. Pat. No. 3,098,748). Whipped toppings formed from these mixes, however, have not been entirely satisfactory since they have a bitter flavor.

It has now been discovered that a whipped topping with a high percent overrun and with a bland, i.e., non-bitter, flavor can be provided by utilizing an acetylated glycerol ester in the whippable topping mix. Thus, in accordance with one embodiment of this invention a dry whippable topping mix is formed comprising a base fat, a water-dispersible protein and an acetylated glycerol ester as the emulsifier.

The term "acetylated glycerol ester" is defined herein as a diglyceride having one long chain saturated fatty acid (acyl) group, one acetyl group and one free hydroxyl group. A typical, but not the only, structure for an acetylated glycerol esterol is as follows:

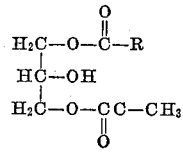

wherein RCO is an acyl radical with 16 to 18 carbon atoms. Although the hydroxyl group is mainly on the beta-carbon, a small proportion of the molecules may have the hydroxyl on the alpha-carbon with one of the acyl groups on the beta-carbon and the other acyl group on the remaining alpha-carbon. In the commercial acetylated glycerol esters, there may also be unreacted long chain fatty acid mono and diglycerides, triglycerides with one or two acetyl groups, acetylated glycerides having unsaturated fatty acids in the molecule and the like. Partially acetylated, distilled monoglycerides of fully hydrogenated cottonseed oil may contain, for example, about 60% monoaceto-monosaturated $C_{16}$ to $C_{18}$ fatty acid glycerides, about 16–20% monoglycerides of saturated fatty acids and 16–20% diaceto-monosaturated fatty acid glycerides.

The acetylated glycerol esters may be prepared in any satisfactory manner. For example, partial glycerides may be made from fully saturated oils and fats, such as lard and cottonseed oil, and the partial glycerides may be reacted with acetic anhydride or triacetin. Specific processes that have been used previously are described in U.S. Pat. No. 2,882,167, the disclosures of which are incorporated herein by reference. The dry whippable topping mix of the invention generally has about 3% to 10% by weight of the effective type of acetylated glycerol esters, i.e., having one long chain saturated fatty acid group, one acetyl group and one free hydroxyl per mol. The amount of acetylated ester mixture may be doubled if diglycerides are employed prior to the reaction with triacetin or the like in lieu of some of the monoglycerides. For example, about 16% of an acetylated mixture of mono-diglycerides is satisfactory.

In the present invention, the dry whippable topping mix may contain, besides the aforementioned acetylated glycerol ester emulsifier, another emulsifier, such as phosphoric acid ester of a glyceride, a partial ester of glycerol and a higher fatty acid and a mixture thereof. The phosphoric acid ester of a glyceride, if used herein, may be a derivative of phosphorus reacted with a glyceride having a saturated ester residue, a derivative of phosphorus reacted with a glyceride having an unsaturated ester residue, or mixtures thereof. The mixtures may be provided from a single glyceride source or from two separately prepared esters. The derivatives of phosphorus may be phosphorus pentoxide, pyrophosphoric acid, metaphosphoric acid, phosphorus halides, ethyl meta-phosphate, phosphorus trioxides, phosphorus pentachloride, phosphorus oxychloride and the like. The glycerides used to prepare the phosphoric acid esters can be pure monoglycerides, a mixture of pure monoglycerides, or a mixture of mono- and diglycerides with $C_{12}$ to $C_{24}$ saturated and/or unsaturated fatty acid residues. Process techniques which have been previously used to provide esters from phosphorus derivatives are described in U.S. Pat. Nos. 2,026,785, 2,177,983 and 2,177,984, the disclosures of which are incorporated herein by reference. Partial sodium salts of the phosphoric acid esters of glycerides may also be employed in this invention.

Another emulsifier which may be employed besides the acetylated glycerol esters in the dry whippable topping mix of the invention is at least one partial glycerol ester. The partial glycerol esters may be distilled monoglycerides or a mixture of mono-diglycerides with $C_{12}$ to $C_{24}$ saturated and/or unsaturated fatty acid residues.

The acetylated glycerol ester emulsifier, alone or in combination with one or more other emulsifiers, is advantageously used with about 22% to 74% base fat, about 15% to 59% sweetening agent, and about 5.25% to 11% water-dispersible protein to provide the dry whippable topping mix of the invention.

The base fat is incorporated into the topping mix to impart the desired creamy-mouth feel. Fats having a Solids Fat Index (SFI) values ranging from 30–50 at 21.1° C., from 3–20 at 33.3° C. and from 0–15 at 42° C. are preferred. Suitable fats, among others, are coconut oil (1 IV), a mixture of cottonseed oil (67 IV) and cottonseed winter oil stearine (1 IV) and a mixture of peanut oil (65 IV) and cottonseed winter oil, hardened (20 IV). However, margarine-type fats with a SFI value at 21.1° C. down to about 12–15 are operable.

A sugar is generally the sweetening agent used in the present invention. Sucrose is preferred. The amount of sweetening agent varies according to taste. Some of the sugar may be replaced with an artificial sweetening agent, such as saccharine or a cyclamate, provided sufficient sugar remains to form a spray dried product having an acceptable physical structure and whipping characteristics. It is also within the scope of this invention to have only a portion of the total amount of sugar, e.g., sucrose, in the emulsion prior to spray drying and to add the remaining portion of the total amount of sugar after spray drying.

Any water-dispersible protein may be employed in the whippable topping mix. However, a caseinate, e.g., sodium caseinate, is preferred.

Lecithin (about .5% to 3%) is used as an optional ingredient in the composition of this invention to provide a product with improved texture. Suitable lecithin materials include natural soybean lecithin, hydroxylated lecithins, and the ethanol insoluble fraction of natural lecithins. The latter product is preferred.

The whippable topping mix may also contain, although not required, about 0.25% to 1% by weight of a carboxymethylcellulose, e.g., sodium carboxymethylcellulose; Kelcoloid "O" (alginic acid esters of propylene glycol); or an edible natural gum, e.g., guar gum, to improve whipping characteristics and foam texture.

The method for providing an aqueous emulsion from the aforementioned ingredients is not critical. Therefore, any procedure known in the art may be employed. One suitable procedure is to dissolve the water-soluble components, e.g., sodium caseinate and sugar, in the desired amount of water. The oil-soluble components, e.g., the emulsifiers, are independently melted and blended, and the blend is added slowly to the solution with vigorous agitation to form a rough emulsion. A fine emulsion is formed subsequently by using a homogenizer. Although the whippable topping mix of the invention is generally a dry powder, it is within the scope of the invention to provide a whipped topping directly from the emulsion, that is without any intermediate drying step.

A powder is prepared from the emulsion by using any drying procedure that will not cause damage to the product. However, the emulsion is generally spray dried to provide a dried product, that is, one containing no moisture or only a trace of moisture, e.g., 1% water.

Thus, in accordance with the present invention, it is now possible to prepare an improved whippable topping mix. The whippable topping mix is capable of being reconstituted and whipped to form a whipped topping with a high percent overrun and with a bland (non-bitter) flavor. This is surprising and unexpected since no one emulsifier prior to the present invention provided a whipped topping with both of the aforementioned desirable properties.

The following examples are submitted to illustrate but not to limit this invention. Unless otherwise indicated, all parts and percentages in the specification and claims are based upon weight.

Example I

A whippable topping mix was prepared from the following ingredients:

| Ingredients: | Parts |
|---|---|
| Coconut oil [a] | 33.0000 |
| Acetylated monoglycerides [b] | 8.0000 |
| Lard monoglycerides [c] | 1.5000 |
| Phosphoric acid esters of glycerides [d] | 0.2000 |
| Lecithin [e] | 0.8000 |
| Sodium caseinate | 7.0000 |
| Sucrose | 49.0000 |
| Color [f] | 0.0012 |
| Vanilla flavor | 0.0370 |

[a] Hydrogenated to 1 IV.
[b] Distilled monoglycerides from fully hydrogenated cottonseed oil with about half of the free hydroxyls acetylated.
[c] Distilled monoglycerides made from lard which has been hydrogenated to about 40 IV.
[d] Partial sodium salts of phosphoric acid esters of a mono-diglyceride concentrate made from 65 IV cottonseed oil.
[e] Fractionated soybean lecithin.
[f] Carotene in oil (30% slurry).

The sodium caseinate, sugar and flavor were dissolved in sufficient water to provide about 50% water in the final emulsion. The color and the emulsifiers were dissolved independently in the melted coconut oil with subsequent addition to the aqueous phase. The resulting mixture was homogenized in a single stage Manton-Gaultin homogenizer (1000 p.s.i.g.) to provide an emulsion. This emulsion was spray dried subsequently in a tower (Western Precipitation, type N) under the following conditions: emulsion feed rate, 0.5 lb./min.; inlet air temperature, 500–550° F.; exit air temperature, 175–210° F.; feed temperature, 115–135° F.; and feed pressure, 700–800 p.s.i.g. The dried powder therefrom was tempered at 35° F. The whippable topping mix was subsequently stored at 90° F. for 4 months without change in whipping properties.

Cold milk (½ cup) was mixed independently with 59 grams of the aforementioned whippable topping mix tempered initialled at 35° F. (before storage) and the aforementioned whippable topping mix stored subsequently at 90° F. by using a Sunbeam Mixmaster (electric household mixer). Whipped toppings were provided for comparative purposes by using the same whipping procedures with a propylene glycol monostearate-containing (PGMS) topping mix and with a lactylated glycerol monopalmitate-containing (GLP) topping mix. The overruns were measured at different time intervals and the flavors were evaluated as indicated herebelow:

| Overrun (percent) after whipping time | Formulation containing acetylated monoglycerides | | Formulation containing— | |
|---|---|---|---|---|
| | Before Storage | After Storage | PGMS After 1 mo. Storage | GLP After 2 mo. Storage |
| Minutes: | | | | |
| 2 | 280 | 240 | 155 | |
| 3 | 300 | 290 | 195 | 251 |
| 4 | 310 | | 201 | |
| Flavor | Bland (non-bitter) | | Vanilla | Bitter |

This example demonstrates that only a whippable topping mix containing acetylated glycerol esters forms a whipped topping both with a bland, non-bitter flavor and with a high percent overrun. A whippable topping mix containing lactylated esters of glycerol and a higher fatty acid, e.g., lactylated glycerol monopalmitate, forms a whipped topping with a bitter flavor. A whippable topping mix containing a partial ester of a glycol and a higher fatty acid, such as propylene glycol monostearate, forms a whipped topping with a low percent overrun.

Example II

The ingredients indicated herebelow were combined to form a whippable topping mix in the same manner as described in Example I:

| Ingredients: | Percent |
|---|---|
| Coconut oil of Example I | 32.1000 |
| Acetylated monoglycerides of Example I | 8.0000 |
| Lard monoglycerides of Example I | 1.5000 |
| Lecithin of Example I | 0.8000 |
| Phosphoric acid esters of Example I | 0.2000 |
| Color of Example I | 0.0012 |
| Sodium caseinate | 6.5000 |
| Sucrose | 50.5000 |
| Vanilla flavor | 0.0370 |
| Water | 0.3618 |
| | 100.0000 |

The same procedure, described in Example I, was used to form whipped toppings except for the use of a commercial size tower for spray drying the above formulation containing acetylated distilled monoglycerides. For comparative purposes, whipped toppings were provided with a formulation containing propylene glycol monostearate (PGMS) and with a formulation containing lactylated glycerol monopalmitate (GLP). The conditions for spray drying in the commercial size tower were: feed pressure to nozzle, 350 p.s.i.g.; feed rate, 1500 lbs./hr., dry basis; feed stock temperature, 127° F.; inlet temperature, 360°–390° F.; and outlet temperature, 205° F.

The whipped toppings therefrom were evaluated by noting the flavor and percent overrun after 2 minutes. The evaluation is as follows:

| Formulation | Overrun (percent) | Flavor |
|---|---|---|
| Acetylated monoglyceride-containing formulation | 304 | Bland (non-bitter). |
| GLP-containing formulation | 283 | Bitter. |
| PGMS-containing formulation | 193 | Typical, vanilla. |

It is evident that an acetylated monoglyceride-containing whippable topping mix is superior to a propylene glycol monostearate-containing whippable topping mix and is superior to a lactylated glycerol monopalmitate-containing whippable topping mix.

Example III

Satisfactory dry whippable topping mixes A, B, C, D, E, F, G and H were prepared by using the procedure described in Example I except as otherwise indicated. The ingredients for these eight whippable topping mixes are listed in Table I.

TABLE I

| | Whippable Topping Mixes (Precent) | | | | | | | |
|---|---|---|---|---|---|---|---|---|
| | A | B | C | D | E | F | G | H |
| Ingredients: | | | | | | | | |
| Cottonseed oil [1] | | | | | 34.0 | 31.0 | | |
| Coconut oil of Example I | 26.6 | 22.6 | 34.0 | 30.5 | | | 32.1 | 27.6 |
| Acetylated monoglycerides | [2] 12.0 | [2] 15.0 | [3] 8.0 | [3] 8.0 | [3] 6.0 | [3] 6.0 | [3] 8.0 | [3] 15.0 |
| Monoglycerides | [4] 3.0 | [4] 3.0 | | [4] 3.0 | [4] 3.0 | [5] 6.0 | [5] 1.5 | |
| Lecithin of Example I | 0.8 | 0.8 | 0.8 | 0.8 | 0.8 | 0.8 | 0.8 | |
| Phosphoric acid esters of Example I | 0.2 | 0.2 | 0.2 | 0.2 | 0.2 | 0.2 | 0.2 | |
| Sodium caseinate | 7.0 | 7.0 | 6.5 | 6.5 | 7.0 | 7.0 | 6.5 | 6.5 |
| Sucrose [6] | 12.5 | 12.5 | 13.0 | 13.0 | 13.0 | 13.0 | 13.0 | 13.0 |
| Sucrose [7] | 37.5 | 37.5 | 37.5 | 37.5 | 36.0 | 36.0 | 37.5 | 37.5 |
| Water | 0.3618 | 0.3618 | | 0.5 | | | 0.3618 | 0.3618 |
| | | | 100.0 | 100.0 | 100.0 | 100.0 | | |
| Color of Example I | 0.0012 | 0.0012 | 0.0012 | 0.0012 | 0.0012 | 0.0012 | 0.0012 | 0.0012 |
| Vanilla flavor | 0.0370 | 0.0370 | 0.0370 | 0.0370 | 0.0370 | 0.0370 | 0.0370 | 0.0370 |
| | 100.0000 | 100.0000 | | | | | 100.0000 | 100.0000 |
| Drying | (N) | (N) | (N) | (N) | (N) | (N) | (C) | (N) |
| Water determined, percent | 0.5 | | | | | | | |
| Overrun (percent) after minutes whipping: | | | | | | | | |
| 2 | 300 | 240 | 255 | 290 | 280 | 283 | 251 | 230 |
| 3 | 290 | 280 | 300 | 295 | 305 | | | 260 |
| 4 | 270 | 295 | 315 | 305 | 310 | | | 270 |
| 5 | | 290 | 310 | 275 | | 320 | 355 | 265 |

[1] Blend of 1 IV cottonseed winter oil stearine and 97% of 67 IV cottonseed oil.
[2] Made from 45% monoglycerides of saturated cottonseed oil; about 30% monoaceto-monosaturated $C_{16}$ to $C_{18}$ fatty acid glycerides.
[3] Same as Example I; made from 90–95% monoglycerides of saturated cottonseed oil; about 60% monoaceto-monosaturated $C_{16}$ to $C_{18}$ fatty acid glycerides, about 16–20% monoglycerides of saturated fatty acids, and about 16–20% diaceto-monosaturated fatty acid glycerides; Distillation Products Industries.
[4] From 80 IV cottonseed oil, 45% monoglycerides, 45% diglycerides, 10% triglycerides.
[5] Distilled monoglycerides 40 IV from animal fat, 90–95% monoglycerides.
[6] Added before spray drying.
[7] Added after spray drying.
(N) Procedure of Example I.
(C) Procedure of Example II.

Having set forth the general nature and specific embodiments of the present invention, the true scope is now particularly pointed out in the appended claims.

What we claim is:

1. A whippable topping mix for preparing a whipped topping which is similar to whipped cream comprising a base fat, a water-disersible protein and about 3% to 10% of a monoacetylated monoglyceride of a $C_{16}$ to $C_{18}$ fatty acid.

2. A dry whippable topping mix for preparing a whipped topping which is similar to whipped cream comprising a base fat, a water-dispersible protein, 3% to 10% of a monoacetylated monoglyceride of a $C_{16}$ to $C_{18}$ fatty acid, a sweetening agent and another emulsifier selected from the group consisting of a phosphoric acid ester of a glyceride, a partial ester of a glyceride and a fatty acid and mixtures thereof.

3. The whippable topping mix according to claim 2 which also contains lecithin.

4. The whippable topping mix according to claim 2 in which the acetylated glycerol ester is the reaction product of a partial glyceride and a compound selected from the group consisting of acetic anhydride and triacetin.

5. A dry whippable topping mix for preparing a whipped topping which is similar to whipped cream comprising about 22% to 74% base fat, about 15% to 59% sweetening agent, about 5.25% to 11% water-dispersible protein and about 3% to 10% of a monoacetylated monoglyceride of a $C_{16}$ to $C_{18}$ fatty acid.

6. A whipped topping which is similar to whipped cream, which has a high percent overrun and which has a bland, non-bitter flavor comprising a base, a water-dispersible protein and about 3% to 10% of a monoacetylated monoglyceride of a $C_{16}$ to $C_{18}$ fatty acid.

7. A dry whippable topping mix for preparing a whipped topping which is similar to whipped cream comprising about 33 parts coconut oil hydrogenated to 1 IV, about 8 parts acetylated monoglycerides from fully hydrogenated cottonseed oil, about 1.5 parts monoglycerides made from lard hydrogenated to about 40 IV, about 0.2 part phosphoric acid esters of mono-diglycerides made from 65 IV cottonseed oil, about 0.8 part lecithin, about 7.0 parts sodium caseinate and about 49 parts sucrose.

8. A dry whippable topping mix for preparing a whipped topping that is similar to whipped cream comprising about 32.1 parts coconut oil hydrogenated to 1 IV, about 8 parts acetylated monoglycerides from fully hydrogenated cottonseed oil, about 1.5 parts monoglycerides made from lard hydrogenated to about 40 IV, about 0.8 part lecithin, about 0.2 part phosphoric acid esters of mono-diglycerides made from 65 IV cottonseed oil, about 6.5 parts sodium caseinate and about 50.5 parts sucrose.

9. A process for preparing a whippable topping mix capable of providing a whipped topping which is similar to whipped cream comprising forming an aqueous emulsion which comprises a base fat, a water-dispersible protein and about 3% to 10% of a monoacetylated monoglyceride of $C_{16}$ to $C_{18}$ fatty acid.

10. A process for preparing a dry whippable topping mix capable of providing a whipped topping which is similar to whipped cream comprising forming an aqueous emulsion which comprises a base fat, a water-dispersible protein, about 3% to 10% of a monoacetylated monoglyceride of a $C_{16}$ to $C_{18}$ fatty acid, a sweetening agent and another emulsifier selected from the group consisting of a phosphoric acid ester of a glyceride, a partial ester of a glyceride and a fatty acid and mixtures thereof; and drying said emulsion to form the dry whippable topping mix.

11. The process according to claim 10 in which the aqueous emulsion also contains lecithin.

12. The process according to claim 10 in which the acetylated glycerol ester is the reaction product of a partial glyceride and a compound selected from the group consisting of acetic anhydride and triacetin.

13. A process for preparing a dry whippable topping mix capable of providing a whipped topping which is similar to whipped cream comprising forming an aqueous emulsion which comprises about 22% to 74% base fat, about 15% to 59% sweetening agent, about 5.25% to 11% water-dispersible protein and about 3% to 10% of a monoacetylated monoglyceride of a $C_{16}$ to $C_{18}$ fatty acid; and drying said emulsion to form the dry whippable topping mix.

14. A process for preparing a whipped topping which is similar to whipped cream, which has a high percent overrun and which has a bland, non-bitter flavor comprising forming an aqueous emulsion which comprises a base fat, a water-dispersible protein and about 3% to 10% of a monoacetylated monoglyceride of a $C_{16}$ to $C_{18}$ fatty acid; drying said emulsion to form a dry whippable topping mix; reconstituting said dry whippable topping mix; and whipping said reconstituted mix to form the whipped topping.

15. A process for preparing a dry whippable topping mix capable of providing a whipped topping which is similar to whipped cream comprising forming an aqueous emulsion which comprises about 33 parts coconut oil hydrogenated to 1 IV, about 8 parts acetylated monoglycerides from fully hydrogenated cottonseed oil, about 1.5 parts monoglycerides made from lard hydrogenated to about 40 IV, about 0.2 part phosphoric acid esters of mono-diglycerides made from 65 IV cottonseed oil, about 0.8 part lecithin, about 7.0 parts sodium caseinate and about 49 parts sucrose; and drying said emulsion to form the dry whippable topping mix.

16. A process for preparing a dry whippable topping mix capable of providing a whipped topping which is similar to whipped cream comprising forming an aqueous emulsion which comprises about 32.1 parts coconut oil hydrogenated to 1 IV, about 8 parts acetylated monoglycerides from fully hydrogenated cottonseed oil, about 1.5 parts monoglycerides made from lard hydrogenated to about 40 IV, about 0.8 part lecithin, about 0.2 part phosphoric acid esters of mono-diglycerides made from 65 IV cottonseed oil, about 6.5 parts sodium caseinate and about 50.5 parts sucrose; and drying said emulsion to form the dry whippable topping mix.

17. The process according to claim 10 in which the sweetening agent is sugar and in which a portion of the total amount of sugar is added prior to drying and the remaining portion of the total amount of sugar is added after drying.

18. A whippable topping mix for preparing a whipped topping which is similar to whipped cream comprising a base fat, a water-dispersible protein and as the only emulsifier a monoacetylated monoglyceride of a $C_{16}$ to $C_{18}$ fatty acid.

19. A process for preparing a whippable topping mix capable of providing a whipped topping which is similar to whipped cream comprising forming an equeous emulsion which comprises a base fat, a water-dispersible protein and as the only emulsifier a monoacetylated monoglyceride of a $C_{16}$ to $C_{18}$ fatty acid.

References Cited

UNITED STATES PATENTS

| | | | |
|---|---|---|---|
| 3,210,198 | 10/1965 | Keller | 99—139 |
| 3,224,882 | 12/1965 | Luck et al. | 99—123 |
| 3,224,884 | 12/1965 | Pader et al. | 99—139 |
| 3,248,229 | 4/1966 | Pader et al. | 99—139 X |

OTHER REFERENCES

Feuge, "Acetoglycerides—New Fat Products of Potential Value to the Food Industry," Food Technology, June 1955, pages 314, 317 (99–118).

A. LOUIS MONACELL, *Primary Examiner.*

J. M. HUNTER, *Assistant Examiner.*

UNITED STATES PATENT OFFICE
CERTIFICATE OF CORRECTION

Patent No. 3,423,211            January 21, 1969

John J. Miles, Jr., et al.

It is certified that error appears in the above identified patent and that said Letters Patent are hereby corrected as shown below:

Column 4, line 42, "initialled" should read -- initially --. Column 6, TABLE I, seventh column, line 4 thereof, "56.0" should read -- 46.0 --.

Signed and sealed this 17th day of March 1970.

(SEAL)
Attest:

Edward M. Fletcher, Jr.           WILLIAM E. SCHUYLER, JR.
Attesting Officer           Commissioner of Patents